(12) United States Patent
Hagen

(10) Patent No.: US 6,615,344 B1
(45) Date of Patent: Sep. 2, 2003

(54) SYSTEM AND METHOD FOR TRACKING SELECTIVELY ENABLING MODULES USED IN AN INTEGRATED PROCESSOR USING A TRACKING REGISTER PROVIDING CONFIGURATION INFORMATION TO AN EXTERNAL PIN

(75) Inventor: Gunnar E. Hagen, Santa Clara, CA (US)

(73) Assignee: Infineon Technologies North America Corp., San Jose, CA (US)

( * ) Notice: Subject to any disclaimer, the term of this patent is extended or adjusted under 35 U.S.C. 154(b) by 0 days.

(21) Appl. No.: 09/389,259

(22) Filed: Sep. 3, 1999

(51) Int. Cl.[7] .......................... G06F 15/177; G06F 1/24
(52) U.S. Cl. ........................................... 713/1; 713/100
(58) Field of Search ................ 713/100, 1; 716/16, 716/17; 710/8, 10

(56) References Cited

U.S. PATENT DOCUMENTS

| | | | | |
|---|---|---|---|---|
| 4,504,783 A | * | 3/1985 | Zasio et al. ................. 710/315 |
| 4,718,064 A | * | 1/1988 | Edwards et al. ............... 713/1 |
| 5,079,725 A | | 1/1992 | Geer et al. .................. 364/550 |
| 5,428,770 A | | 6/1995 | Garner ....................... 395/575 |
| 5,577,232 A | * | 11/1996 | Priem et al. .................. 714/28 |
| 5,777,488 A | | 7/1998 | Dryer et al. ................... 326/38 |
| 5,884,023 A | | 3/1999 | Swoboda et al. ...... 395/183.06 |
| 5,923,899 A | * | 7/1999 | Martin et al. ................... 713/1 |
| 5,950,011 A | * | 9/1999 | Albrecht et al. ............... 713/1 |
| 5,954,810 A | * | 9/1999 | Toillon et al. ............... 709/224 |
| 6,021,438 A | * | 2/2000 | Duvvoori et al. ........... 717/170 |
| 6,069,489 A | * | 5/2000 | Iwanczuk et al. ........... 324/754 |

OTHER PUBLICATIONS

Tannebaum, Andrew S., "Structured Computer Organization", 1984, Prentice–Hall Inc., pp. 10–12.*

* cited by examiner

Primary Examiner—Thomas Lee
Assistant Examiner—James K. Trujillo
(74) Attorney, Agent, or Firm—Fish & Richardson P.C.

(57) ABSTRACT

An integrated processor is provided having functional unit tracking and monitoring capabilities. The processor core is configured to read configuration data and provide it to a configuration register. The configuration register enables various functional units also integrated onto the integrated processor. A tracking register is further provided, wherein the tracking register maintains a copy of the configuration data and a copy of the integrated processor's version number. The version number and the configuration data are provided to an external pin for monitoring.

13 Claims, 3 Drawing Sheets

SYSTEM AND METHOD FOR TRACKING SELECTIVELY ENABLING MODULES USED IN AN INTEGRATED PROCESSOR USING A TRACKING REGISTER PROVIDING CONFIGURATION INFORMATION TO AN EXTERNAL PIN

BACKGROUND OF THE INVENTION

1. Field of the Invention

The present invention relates to integrated circuits and, particularly, to a system and method for enabling functional units.

2. Description of the Related Art

Integrated processors are data processing devices having both a processor core and peripheral devices, or functional units, of various types. The processor core and the functional units are typically interconnected via a common bus. Because both the processor core and the functional units are implemented on a single integrated circuit, integrated processors are useful for cost sensitive control functions.

Integrated processors frequently operate in a variety of modes but may be customized for individual applications. For example, one or more functional units may be selected to be active. Such integrated processors typically have their modes customized through bits stored in nonvolatile memory. These bits are collectively referred to as the configuration register. The configuration bits can be programmed at the same time the on-chip non-volatile memory is programmed and thus the integrated processor may be customized for the application. The configuration bits form signals which are continuously driven to various circuits to select the operating modes.

Much of the cost savings associated with integrated processors is the ability to fabricate a plurality of functional units onto a single chip. Frequently, however, such functional units implement features developed by third party vendors. As such, the integrated processor manufacturer must typically pay a royalty for each chip produced. Often, however, not all of the on-chip functional units are enabled. In this case, it is undesirable for the chip manufacturer to pay a royalty for an unused functional unit. At the same time, however, the third party vendor desires confirmation of whether its functional unit is implemented on a chip before agreeing to accept a lower royalty or no royalty at all on that chip.

As such, there is a need for monitoring which functional units on an integrated processor are implemented.

SUMMARY OF THE INVENTION

These and other drawbacks in the prior art are overcome in large part by a system and method according to the present invention. Briefly, an integrated processor is provided having an integrated processor core. The processor core is configured to read configuration data and provide it to a configuration register. The configuration register enables various functional units also integrated onto the integrated processor. A tracking register is further provided, wherein the tracking register maintains a copy of the configuration data and a copy of the integrated processor's version or serial number. The version number and the configuration data are provided to an external pin for monitoring.

Further, a checking circuit is provided to monitor that the external pin is not being externally overdriven. If it is, the functional units are all disabled. A CHECK control signal is provided to a tri-state output driver, which drives the check pin. When the tri-state output driver is active, the contents of the tracking register may be output via the pin. When the tri-state output driver is deactivated, a checking selection circuit monitors the condition of the pin. If the pin is being externally driven, a DISABLE control signal is generated.

A monitoring environment according to an embodiment of the present invention permits the collection of a database associating integrated processor serial numbers and activated or enabled functional units. The monitoring environment may further be used to check if particular integrated processors are, in practice, employing only the correct functional units.

BRIEF DESCRIPTION OF THE DRAWINGS

A better understanding of the invention is obtained when the following detailed description is considered in conjunction with the following drawings in which.

DETAILED DESCRIPTION OF THE INVENTION

FIGS. 1–5 illustrate a functional unit tracking and enabling system and method for an integrated processor. The functional unit tracking and enabling method allows for specific functional units to be configured for operation, and to report which functional units are then active. Thus, the manufacturer can track use of third party vendors' components.

Figure 1:
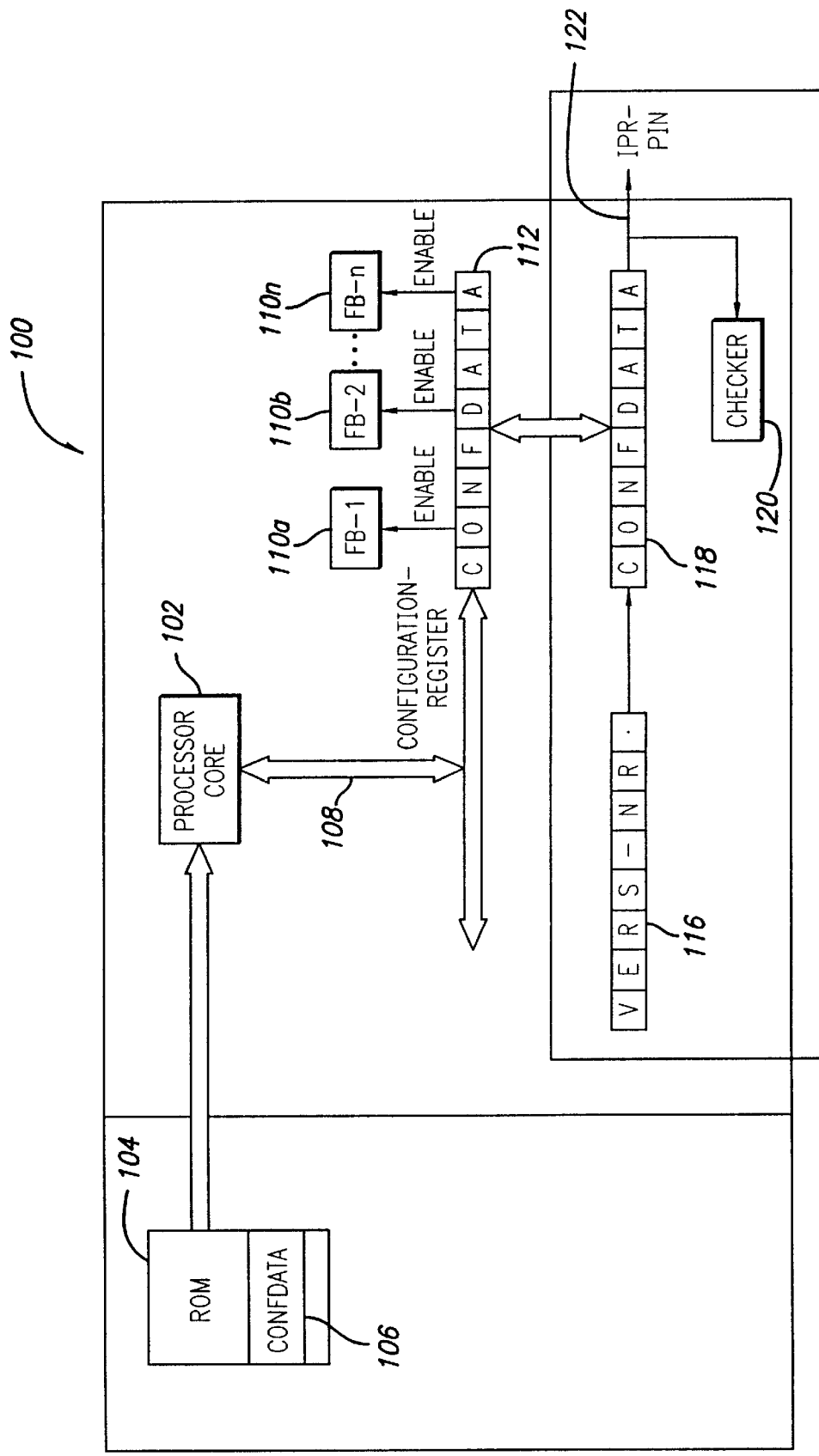
FIG. 1 is a diagram illustrating an integrated processor according to an embodiment of the invention.

Turning now to FIG. 1, an integrated processor according to an embodiment of the present invention is illustrated therein and generally identified by the reference numeral 100. An exemplary integrated processor is the TriCore family of processors, available from Infineon Technologies Corporation. The integrated processor 100 may be coupled via an address and bidirectional data bus to a read only memory (ROM) 104 which stores configuration data 106. For example, the configuration data 106 may include one or more bits to activate various of the functional units 110a–110n, as will be explained in greater detail below.

The integrated processor 100 includes a processor core 102. The processor core 102 may be any of a variety of microcontroller or digital signal processor cores, such as those available from Infineon Technologies Corporation. The processor core 102 is coupled to a configuration register 112.

The configuration register 112 stores the configuration data from the ROM 106. The configuration register 112 is coupled to provide enable signals to one or more functional units 110a, 110b, . . . , 110n. In particular, the configuration data 106 stored in the configuration register 112 is used to derive enable signals to selectively enable one or more of the functional units 110a, . . . , 110n.

The integrated processor 100 further includes a tracking register 114. The tracking register 114 stores a chip version or serial number 116 and a copy of the configuration register data 118. The chip version number 116 and the configuration register data 118 may be read out serially via a pin 122. Thus, the enablement of particular functional units may be monitored. Non-active functional units need not necessarily have to have a royalty paid thereon, and the licensor can be assured that it is being paid a royalty whenever the functional unit is used. Further, a checking circuit 120 is provided to monitor that the pin 122 is not being externally over-driven. In this case, all functional units are automatically disabled.

Figure 2:
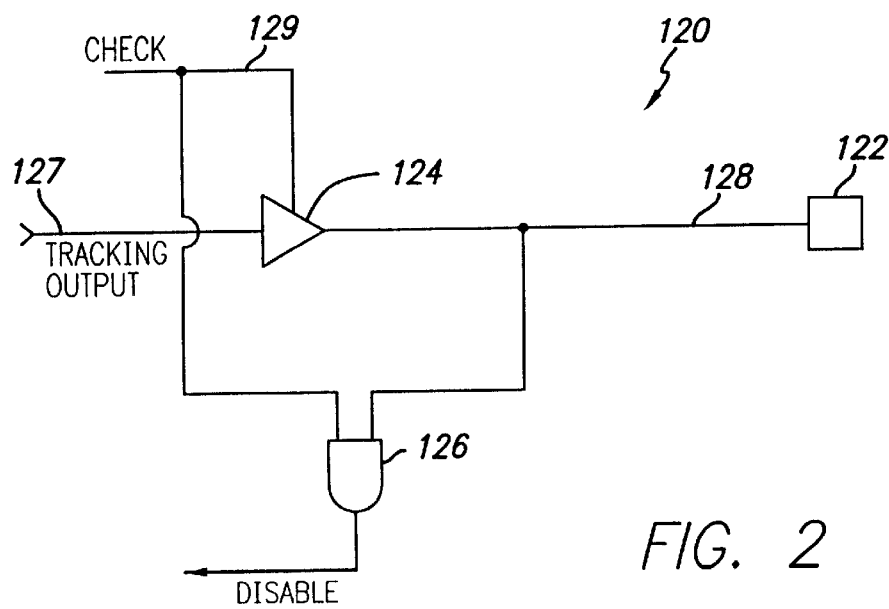
FIG. 2 is a diagram illustrating a checking circuit according to an embodiment of the invention.

For example, an exemplary checking circuit 120 is illustrated in greater detail in FIG. 2. As shown, a pin 122 provides a node for connection between circuitry inside the chip and outside the chip. The checking circuit 120 further includes a tri-state output driver 124 and check selection circuit, such as an AND gate 126. The tri-state output driver 124 receives as an input the tracking register output along line 127 and a CHECK signal along line 129. The CHECK signal may be provided from the processor core 102.

The tri-state output driver 124 is capable of providing an output on line 128 of one (1), zero (0) or high impedance. When the output is one (1), the output of pin 122 is one (1). When the output is zero (0), the output of pin 122 is zero (0). When the CHECK signal, available from the processor core (FIG. 1) causes the output to be high impedance, the AND gate 126 is provided with both the CHECK signal and whatever signal is present on the line 128. Thus, if a signal is applied externally to the pin 122, the AND gate 126 will provide a DISABLE signal to one or more functional units.

Figure 3:
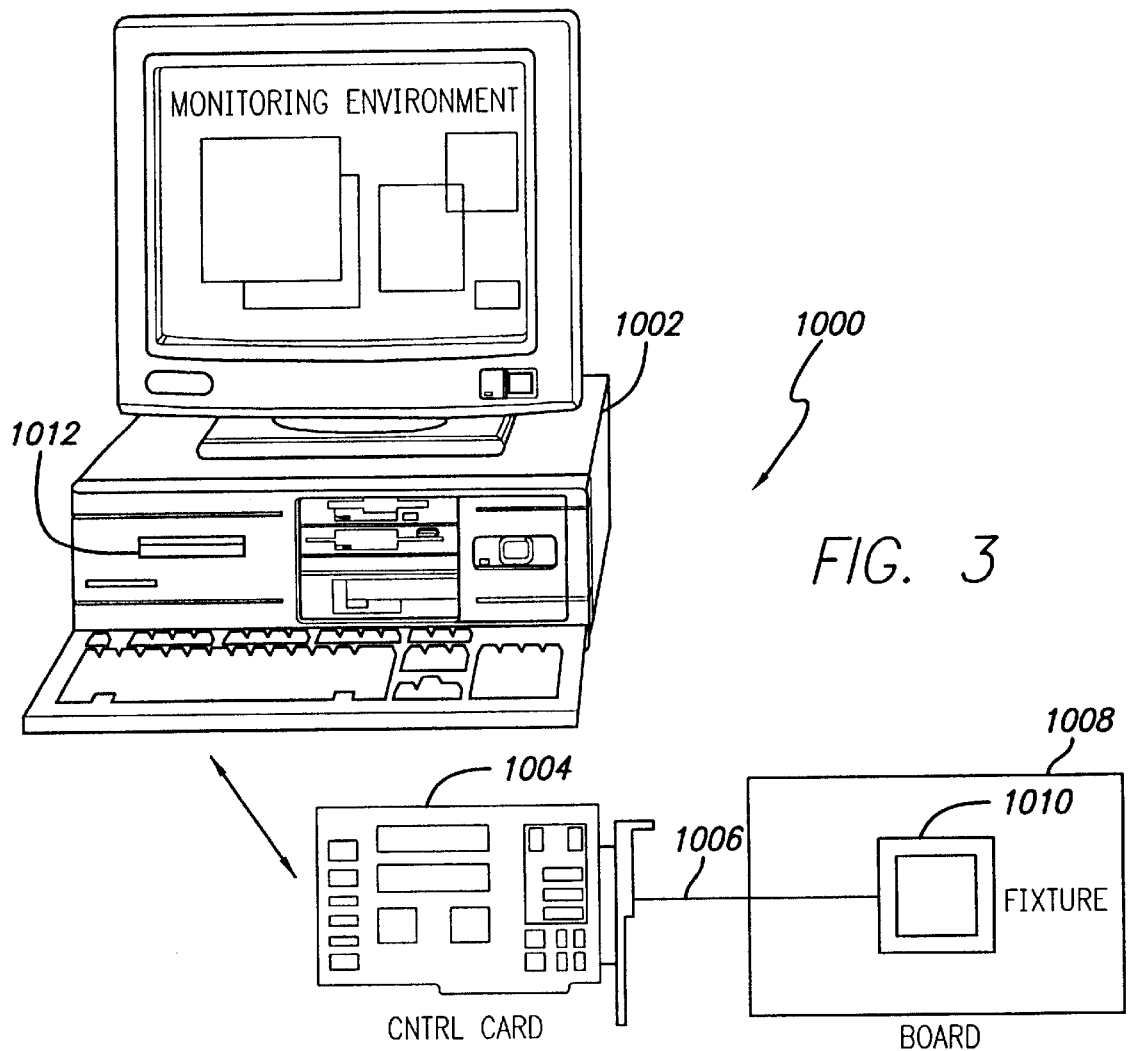
FIG. 3 is a diagram of a monitoring environment according to an embodiment of the invention.

The integrated processor 100 is thus suited for use in a monitoring environment 1000, as shown in FIG. 3. The monitoring environment 1000 is configured to test various integrated processors 100 and read the contents of their tracking registers 114. The monitoring environment 1000 then maintains a database of serial numbers and enabled functionality. As shown, the monitoring environment 1000 includes a computer 1002. The computer 1002 may be any of a variety of computers, such as a PC or PC compatible computer. The computer 1002 includes a controller card 1004 which communicates via a bus 1006, such as a serial bus, with a test board 1008. The test board 1008 includes a fixture 1010 for receiving the integrated processor 100 (FIG. 1). The test board 1008 and the control card 1004 include any necessary circuitry to emulate a working environment for the integrated processor 100.

The control card 1004 thus is configured to receive the output of pin 122 (FIG. 1) and store it in a database in memory 1012. The memory 1012 is a hard disk or other memory. Such a control card 1004, for example, may be a development card used to simulate a working environment for the integrated processor. In addition, the monitoring environment 1000 may be programmed to compare the read out serial number and configuration data with the data already stored in the database in memory 1012. The monitoring environment 1000 can thus be employed to check the use of various functional units.

Figure 4:
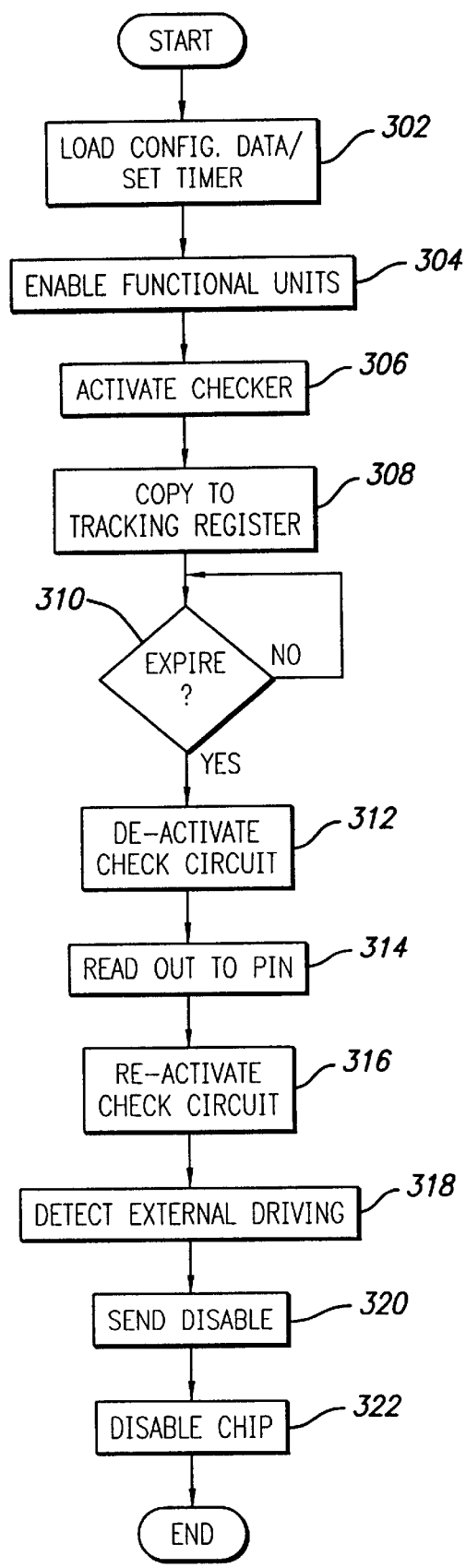
FIG. 4 is a flowchart illustrating a method according to an embodiment of the invention.

A flowchart illustrating operation of an embodiment of the present invention is shown in FIG. 4. Upon reset, the processor core 102 loads configuration data from the ROM 104 to the configuration register 112, in a step 302. In addition, the processor core 102 may activate a timer (not shown) which controls the periodic reading out of the contents of the tracking register 114. In a step 304, the contents of the configuration register 112 are used to enable various of the functional units 110a . . . 110n. In a step 306, the check circuit 120 is activated. For example, the CHECK line 129 is activated so that the output of the tri-state driver 124 is high impedance. In a step 308, the contents of the configuration register 112 are copied to the register 118. If the timer expires, in a step 310, then in a step 312, the check circuit is deactivated; otherwise, the timer continues its countdown. Then, in a step 314, the contents of the register 118 and the serial number 116 are read out the pin 122. Once this has been accomplished, the check circuit 120 is reactivated, in a step 316, and the timer is reset.

While the timer's count is ongoing, the check circuit detects whether the pin 122 is being externally driven, in a step 318. If so, then in a step 320, the check circuit sends a DISABLE signal to the processor core 102. The processor core 102 then causes the functional unit(s) to be disabled, in a step 322.

Figure 5:
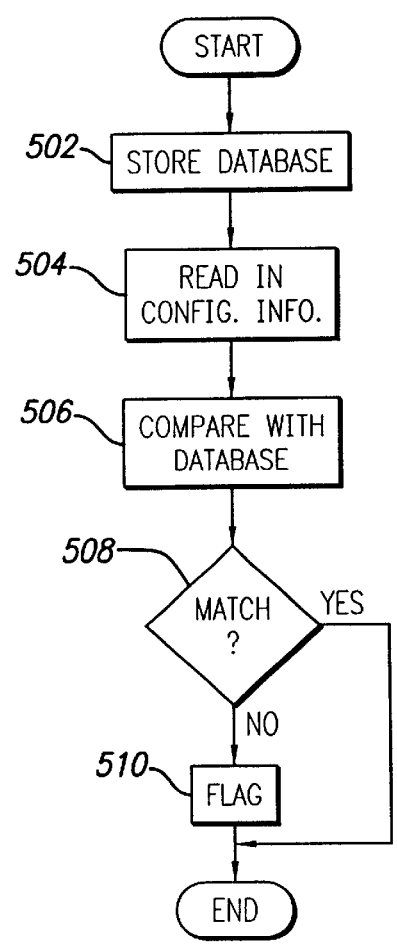
FIG. 5 is a flowchart illustrating a method according to another embodiment of the invention.

A flowchart illustrating operation of a monitoring environment according to an embodiment of the invention is shown in FIG. 5. In a step 502, serial numbers and corresponding data concerning enabled functional units are stored in a database, for example, by the manufacturer. In a step 504, one or more of the integrated processor chips may be pulled from a product or production line and tested (i.e., have their tracking register read out) to determine whether the functional unit information is correct. In a step 506, the read out information is compared with the information stored in the database in step 502. If the information is determined to be correct, as determined in a step 508, the information may be logged and the process ends. However, if the information does not check, then in a step 510, the chip is flagged and the monitoring system alerts the operator.

What is claimed is:

1. An integrated processor, comprising:
    a processor core;
    a memory bus;
    one or more functional units operably coupled to said processor core;
    a configuration register to receive configuration data from a memory through said memory bus and configured to enable one or more of said functional units; and
    a tracking register configured to maintain a copy of said configuration data stored in said configuration register and to provide said copy of said configuration data to an external pin.

2. An integrated processor in accordance with claim 1, said tracking register further configured to maintain a copy of a version or serial number of said integrated processor.

3. An integrated processor in accordance with claim 2, wherein contents of said tracking register are serially provided to said external pin.

4. An integrated processor in accordance with claim 3, further including a checking circuit configured to identify if said external pin is being overdriven.

5. An integrated processor in accordance with claim 4, wherein said checker circuit is further configured to disable one or more of said functional units if said external pin is being overdriven.

6. A method for configuring an integrated processor, comprising:
    providing configuration data from a memory to a configuration register, wherein said configuration register enables selected functional units on said integrated processor;
    copying said configuration data to a tracking register; and
    providing contents of said tracking register to an external pin.

7. A method in accordance with claim 6, further including copying a version number of said integrated processor.

8. A method in accordance with claim 7, wherein said contents of said tracking register are provided serially to an external pin.

9. A method in accordance with claim 8, further including checking if said external pin is being overdriven.

10. A method in accordance with claim 9, further including disabling said functional units if said external pin is being overdriven.

11. An integrated processor, comprising:

one or more processor cores;

one or more functional units;

means for enabling one or more of said functional units, said enabling means including a configuration register for storing configuration data; and means for identifying which of said one or more functional units is enabled, said identifying means including a tracking register for maintaining a copy of the configuration data stored in the configuration register, the tracking register readable through an external pin.

12. An integrated processor according to claim 11, said identifying means including a checker circuit for determining if said external pin is being overdriven.

13. An integrated processor, comprising:

a processor core;

a memory bus;

one or more functional units operably coupled to said processor core;

a configuration register to receive configuration data from a memory through said memory bus and configured to enable one or more of said functional units;

a tracking register configured to maintain a copy of a serial number of said integrated processor and to maintain a copy of said configuration data stored in said configuration register, said tracking register to serially provide said copy of said serial number and said copy of said configuration data and to an external pin; and a checking circuit configured to identify if said external pin is being overdriven, wherein said checking circuit is further configured to disable one or more of said functional units if said external pin is being overdriven.

* * * * *